April 24, 1956 — R. W. WIRTZ — 2,742,830
SELF-POSITIONING PHOTOTYPOGRAPHICAL MATRIX
Filed March 25, 1955 — 2 Sheets-Sheet 1
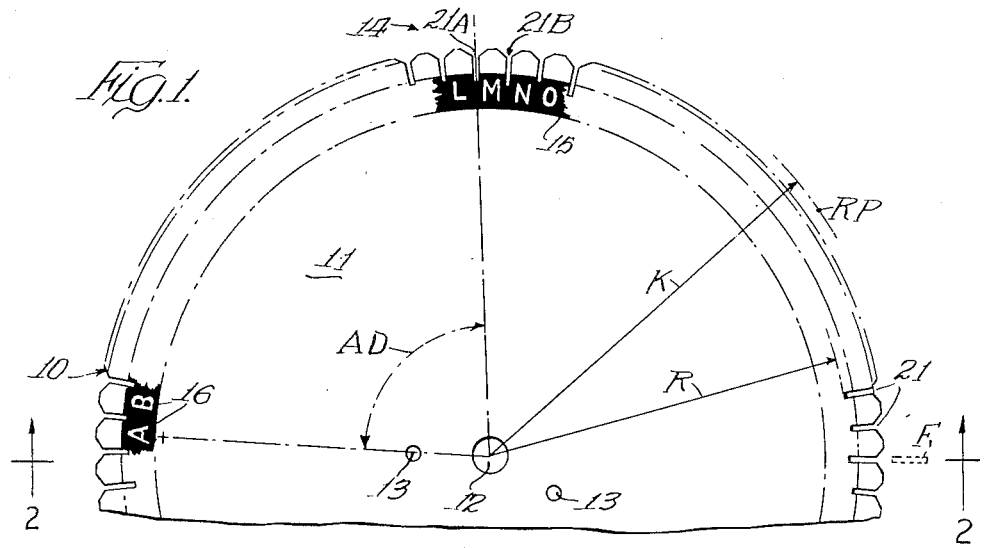
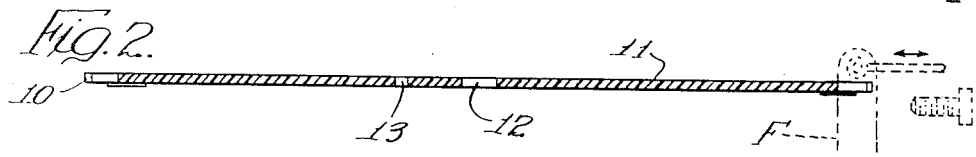
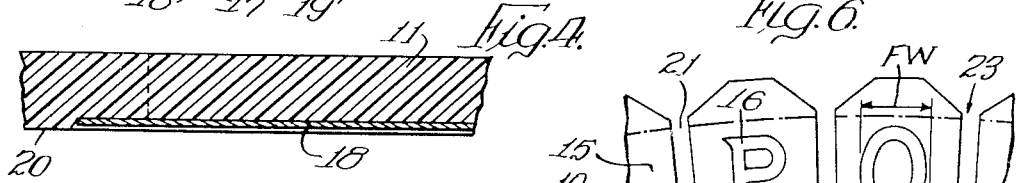
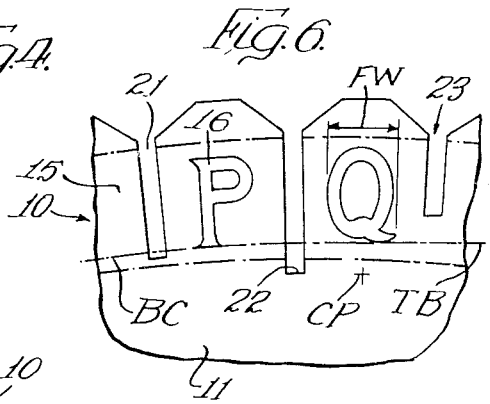
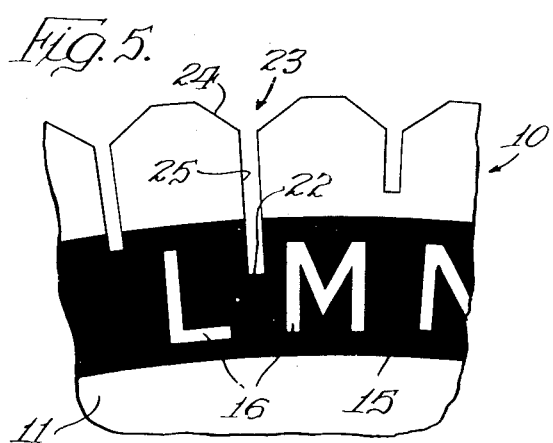
INVENTOR.
Robert W. Wirtz April 24, 1956 R. W. WIRTZ 2,742,830
SELF-POSITIONING PHOTOTYPOGRAPHICAL MATRIX
Filed March 25, 1955 2 Sheets-Sheet 2
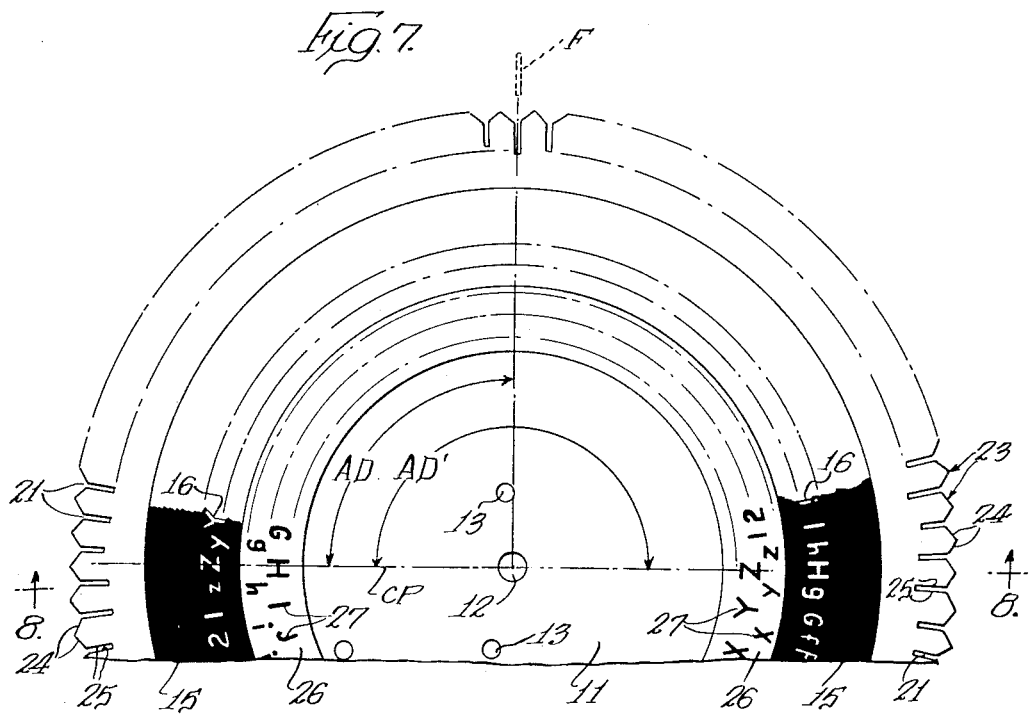
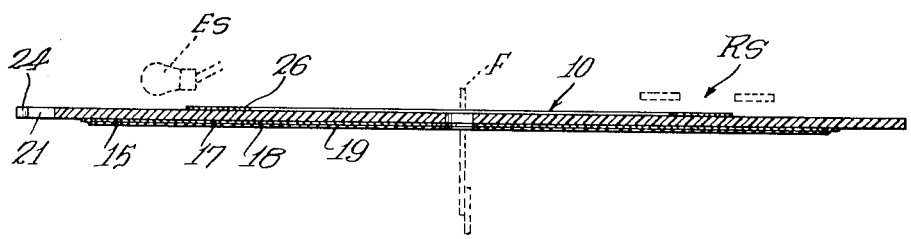
INVENTOR.
Robert W. Wirtz
BY
Kegan and Kegan
Attys.

2,742,830

SELF-POSITIONING PHOTOTYPOGRAPHICAL MATRIX

Robert W. Wirtz, Plainfield, N. J., assignor to Wirtz Company, Chicago, Ill., a copartnership Original application December 1, 1950, Serial No. 198,596, now Patent No. 2,649,036, dated August 18, 1953. Divided and this application March 25, 1955, Serial No. 496,813

7 Claims. (Cl. 95—4.5)

This invention relates to a multiple, exchangeable self-positioning, phototypographical matrix.

One of the major problems of phototypography is the precise and yet economical positioning of the various matrix units, relative to successive portions of photographic film or paper.

Several arrangements are known wherein the matrix units, including the upper and lower case letters of any desired alphabet, are distributed around peripheral parts of a disc. It is very desirable for the ultimate copy, and accordingly for the photographic film, that consecutive letters should be spaced with great regularity, so that the words, lines and entire pages are easy to read and agreeable to look at. Simple automatic spacing of letters such as that produced by an ordinary typewriter is very imperfect in this respect. It uses mechanically uniform spacing for and between all letters, thereby producing optically non-uniform distribution; that is, forcing the basic letter units into inesthetic and poorly legible forms and causing irregular distribution of light and shade, aside from irregularity of the right-hand margin. One of the aims of phototypography is to utilize well-proportioned and well-dimensioned types and to space successive types in optically proper accordance with their proportions and dimensions.

Basically such spacing starts with the use of types having different width, to each of which is added a certain intertype space or clearance. However, it is frequently desirable to apply what is known as line-justification and kerning.

Line-justification involves elimination of the right-hand marginal irregularities produced by purely mechanical spacing. Since types are and should be basically invariable, justification practically means a slight irregularity of intertype spacing.

Kerning can be illustrated by the case where a capital A is followed by a capital V in the Roman alphabet. In order to produce substantially the same optical uniformity in this event as in the case of successive letters like capital N and capital M, it is necessary to use kerning, that is, a spacing less than that based on the total width of the A and V. This involves a slight non-uniformity of intertype spacing again, of different nature than in line-justification, but affecting such justification.

For these and various related typographical problems an adequate phototypographical solution is possible only when one basic operation is performed with absolute safety and accuracy: that of establishing a reliable basic position or datum line for each successive type, in the exposure station wherefrom the types are transferred to the successive portions of the photographic film or paper. Spacing modifications for line adjustment and kerning can then be applied to the type, or film, with relative simplicity.

In the past this basic positioning or establishment of datum lines has been undertaken by means of spacing cams or other spacing instrumentalities, correlated with the film or paper feeding means by rather complicated devices. So long as the basic correlation between the letter disc, the spacing cam and the film was accurate, the further operations in such earlier systems followed with adequate precision. However, the condition precedent was not always fulfilled; in fact it is not always fulfilled even in some of the most advanced systems of this kind now in use. Accuracy of correlation between the three units (disc, cam and film) of the conventional systems is available only by means of multiple adjustment features, which are very expensive both in manufacture and use.

In addition, known systems for correlating the letter disc and the means for selecting the types which are to be transferred to the successive portions of the photographic film or paper leave much to be desired. They do not readily permit new arrangements of characters, new additions to any type family, or the composition of printed matter in any language, since it is not practical to have a separate selecting means for each new arrangement, addition or language to be printed. Also, in known systems the hazard is always present because of the chance of mechanism misalignment that the character selected is not the one actually being reproduced.

By contrast, the new article of commerce disclosed herein provides the basic three-unit correlation of disc, cam and film together with correlated character selecting means in a manner whereby it is practically free from any cost or error in operation, and whereby it involves savings rather than costs in the manufacture of the phototypographical means as an entirety. The article combines the letter disc, spacing cam, and character selecting means in a single, extremely simple and inexpensive unit, completely eliminating the need for one of the multiple mutual adjustments used in the past. In this manner, each disc may represent a different style or size of type, having its own index control for the individual film feed advance required for each type thereon, and having its own character selecting means for choosing the types which are to be photographed. And, since each disc does have its own character selecting means rather than having to depend on any set reading dial or scale, any arrangement of characters may be made, the addition of characters or symbols to any font is permitted, and composition in any language is readily achieved.

This is achieved by the feature of combining for instance, the usual annular series of types with a concentric, for instance outermost part of the letter disc, which part serves as an integral spacing cam. For this purpose said part preferably has a system of recesses, or specifically notches, cut into the body of the disc. Most desirably these recesses have wide, outwardly expanding entrance portions, adapted to guide a cam follower, pursuant to very coarse prepositioning of the disc. The recesses preferably have narrow inner portions, cut to such a depth as to complete the accurate guiding of a cam follower in accordance with the requirements stated above. Such a cam follower can be started from a base line outside of the disc periphery, and can measure the distance from that base line to the end of a recess, regardless of such lateral deflection as it may undergo due to the lateral guidance by the entrance portions of the recesses. In this manner the old object of accurate, versatile and generally efficient letter spacing is achieved in a simplified yet improved manner, by an approach to the matter of basic three-unit correlation which is new.

Also provided in the letter disc is a second series of types, corresponding to those of the first series and in related order thereto. The second series of types serves as a reader or guide for informing the operator as to which type is in position for photographing, while also acting as a selection means to rapidly position the types for exposure. Since the types of both series are in related order and in positive relation to each other on the same disc, error can never develop as to the relative position between the printing surface and the reader or guide surface. All the operator need do for character selection is to get the selected type character in the second series at an approximate position at a reader station. This also approximately positions the corresponding selected type in the first series at an exposure area, after which the integral spacing cam and the cam follower operate to accurately position the selected type for photographing. Speed of operation is greatly increased, since only approximate positioning is required, with the cam and cam follower taking over for the final accurate positioning movement, while the operator has positive information as to which type is in position for reproduction.

These and other features of the invention will be understood more clearly upon a study of the disclosure which follows. In this disclosure reference will be had to the accompanying drawings, which illustrates certain forms of the new article of commerce, embodying the foregoing principles and advantages as well as other features which may be pointed out as this description proceeds or which are inherent in the present invention. For purposes of clarity in exposition the following description is explicit and the accompanying drawing is detailed, but it is distinctly to be understood that said exposition is illustrative only and that the invention is not restricted to the particular details recited in the description or shown in the drawing.

This application is a division of the subject matter of application Serial No. 198,596, filed December 1, 1950, and now Patent No. 2,649,036, issued August 18, 1953; a continuation in part of application Serial No. 147,827, filed March 6, 1950, and now Patent No. 2,646,731, issued July 28, 1953; and a continuation-in-part of co-pending application Serial No. 314,800, filed October 15, 1952, now abandoned. The device disclosed herein may be used in the photocomposing apparatus disclosed in said patents; or it may be used in a similar but slightly modified mechanism having an indexing window for indicating which disc character is being exposed rather than having a set character reading scale.

In the drawings:

Figure 1 is a plan view of the new article of commerce;

Figure 2 is a section through the same along lines 2—2 in Figure 1;

Figure 3 is an enlarged detail from Figure 2;

Figure 4 is a slight modification of this detail;

Figure 5 is an enlarged detail from Figure 1;

Figure 6 is a slight modification of that detail;

Figure 7 is another modification of the invention; and

Figure 8 is a section taken along lines 7—7 in Figure 7.

The new article consists in a generally disc-shaped body 10 which is most simply and economically made in form of a generally circular, flat sheet of rigid material such as a glass or transparent plastic. This disc 10 can be used in conjunction with machines such as those of the aforementioned Patents 2,646,731 and 2,649,036. For this purpose it has a hub portion 11 perforated by a central spindle hole 12. The hub portion also has slightly eccentric dowel holes 13, in order to insure uniformly reproducible alignment of the disc with spindle operating and position indicating means. I prefer to use two dowel holes 13, located on radii forming an angle of less than 180°, in order to insure irreversible position of the disc.

The generally outermost annular part of the disc, designated by numeral 14, serves as the spacing cam. Another annular part of the disc, preferably intermediate the central hub 11 and the outer cam 14 and identified by numeral 15 serves as the typographical matrix.

The matrix 15 as shown forms a single, opaque band or ring, uninterrupted except by types 16 having the desired type faces. This band and the types therein are preferably formed by photographically reproducing a selected font or type. For this purpose the opaque band may be provided by an ethyl cellulose film suitably cemented to the transparent disc and having a photographic emulsion thereon; or the emulsion may be applied to the disc direct. The outersurface 17 of the emulsion 18 may be protected by a suitable coating 19 of transparent material as shown in Figure 3, or may be recessed below the general surface 20 of the disc as shown in Figure 4, in order to avoid accidental scratching of or other injury to the emulsion and thus to preserve type reproduction with a maximum of available contrast. In a broad sense, it makes little difference whether the type ring 15 is opaque and the types 16 are clear, or vice versa. Practically, however, I prefer the arrangement as described, since it simplifies the production of special effects, such as shading or other modifications of the types in the ultimate copy, which is often desired in phototypography. For such purposes it is merely necessary to place some fabric or the like over the exposed portions of the type ring.

The types 16 (including letters, numerals, punctuation signs and other indicia) have uniform distances from the center hole 12, and uniform orientation for their type base TB, preferably tangentially of an imaginary base circle BC. Their annular sequence is best arranged in the usual alphabetical succession.

Each type 16 has a certain overall or total face width, diagrammatically indicated by FW. For the above mentioned purpose of insuring adequate correlation of the spacing cam 14 and letter ring 15, I prefer to utilize the center point CP of the face with FW of each letter. Manifestly the center points of successive letters can be spaced either by uniform angular distances (such as 5° in case of 72 letters and other types on a disc), or by distances proportioned to the face width FW of each letter. While proportioned spacing is desirable for the ultimate film copy, as noted above, said uniform, unproportioned spacing is preferable for the letter band 15, since it greatly simplifies the production of the outermost cam ring 14.

This cam ring 14 preferably comprises a number of slots 21, extending in a radial direction from the periphery into the body of the disc, and angularly spaced at uniform distances from one another in order to allow production of a disc or stack of discs with the aid of a simple self-indexing machine. The total number of the so-arranged slots 21 is the same as the total number of types 16 in the letter band. Each type is associated with one specific slot. For instance the letter A is associated with a slot 21A; the letter B with a slot 21B; etc. These different slots 21A, 21B, etc., follow one another in the same sequence and at the same spacing as the corresponding letters. The main function of each slot 21 is to provide, by and at its inner end, an abutment and reference point for the positioning, basic spacing, kerning and other adjustment of the corresponding type to be copied from the matrix.

For this purpose the radial distance R between the center hole 12 and the inner end 22 of a slot 21 is R=K—FW' when K is the distance from the center hole to some given reference point RP outside the disc and FW' is a suitable fraction or multiple of the aforementioned full width FW of the corresponding type. Differently expressed, in manufacturing the disc a cutting tool is successively fed into the disc from a fixed starting point by distances proportional with the different face width dimensions FW of the successive letters. Any slight out-of-roundness of the disc 10, or irregularity of the peripheral surface, is obviously insignificant. In the use of the disc, a feeler rod or the like is fed radially, from a fixed starting point, into the successive slots, and causes during such movement a proportional paying out of the photographic film.

This basic film spacing may or may not be modified for purposes of kerning, line adjustment and the like; for instance by shifting the starting point of the feeler rod. The important thing is that a basic spacing reference is integrally provided by the present disc, in a manner which is as efficient in use as economical in production.

Furthermore the cam slots 21 allow rapid positioning of each type relative to the photographic film. This is achieved mainly by the outer parts 23 of the slots 21. These outer parts can be substantially uniform in all slots, while the inner ends 22, as noted, are different. The outer ends 23 expand outwardly, being formed with divergent edges 24, while the inner parts of the slots have parallel side edges 25. When a feeler rod F is radially inserted in a slot 21 after coarse pre-positioning of the disc, it first hits an outer edge 24, causing a slight angular movement of the disc either forward or backward and thereby automatically completing the accurate indexing of the feeler and slot; the angular motion of the disc has no effect on the feeding of the film which depends only on the radial distance traversed by the feeler, that is, on the position of the inner end 22 of the slot.

Each type 16A, etc., may have its correlated slot 21A on a radius laterally adjacent those of its base TB, as shown in Figure 5, or on a radius displaced by a considerable angular distance AD from the center point CP, as shown in Figures 1 and 6. In either case, inner ends 22 of slots 21 may lie outside of the type ring 15 (as shown in Figures 5 and 7), or in an area spaced inward thereof (as shown in Figure 6), or in any intermediate area. Little angular space is occupied by these slots, so that the radially overlapping arrangement of slots and types (Figure 6) does not appreciably reduce the space available for types, on a disc of given size while the peripherally widely spaced arrangement of slots and types (same figure) obviously serves to minimize interference between the mechanism F and the type to be exposed. At the same time the arrangement of peripherally starting cam slots extending far into the disc provides a cam follower travel of appreciable length, and resulting accuracy of movements of the cam follower and film feed mechanism F, without appreciable enlargement of the disc unit and of the machine wherein it is used.

In order to provide an integral photographical matrix disc not only having its own control means 21 for measuring the width of its types and its own self-positioning means 24, but also to have a disc possessing its own reader or guide for selecting the types to be photographed, a second annular portion, concentric with the typographical matrix band 15, is provided. Referring to Figures 7 and 8, the reader portion comprises a ring 26 on the upper disc face having a set of types 27 thereon corresponding to and in an order related to that of the types 16. Ring 26 and the types 27 may be provided on the disc by any suitable process, such as by silk screening. Each exposure type on band 15 has its correlated reader type on ring 26 on a second radius either displaced by some angle AD' from the center point CP, as shown in Figure 7, or the correlated types may be adjacent. It is preferred that there be angular displacement between the reader station whereat the types on ring 26 are positioned, the exposure station whereat correlated types on band 15 are positioned for exposure to film, and the measuring station whereat feeder rod F is radially inserted into slot 21 corresponding to the positioned types. In this manner there is no interference with the separate operations at each station. If, for instance, the reader station and exposure station are angularly displaced from each other by 180 degrees, then the correlated types on bands 15 and 26 have an angular displacement AD' from each other of 180 degrees, as shown in Figure 7. Also, if the measuring station is angularly displaced from the other stations, then the notches 21 at the edge of the disc are angularly displaced from their corresponding types 16 by an angle AD, which in Figure 7 approximates 90 degrees.

In operation, when a type on the ring 26 is approximately positioned at the reader station RS, it approximately positions a correlated type on typographical band 15 at the exposure station ES. As the feeler rod F is radially inserted into a slot 21 corresponding to the positioned types, it hits the divergent surface 24, causing the disc to have a slight angular movement to automatically accurately position the selected type on band 15 for photographing. As hereinabove disclosed, movement of rod F in slot 21 determines the film feed for each exposed type. The arrangement of the second annular band 26 on the disc not only permits a rapid prepositioning of the types on band 15 for photographing, but also greatly simplifies the mechanism in the machine in which the disc is used, since no additional reading apparatus and linkage, other than a reading station, is required for positioning the selected types.

The flat discs 10, as described, can be stacked and stored without wrappers or the like. Insertion and use are simple, rapid and precise, by virtue of the self-indexing features described.

Each style and size of type may have its own special symbols and characters, since each disc has its own character selecting means which frees it from would be rigid limitations imposed when the selecting dial or scale is on the machine wherein the disc is used. Each disc thus may be produced with any number of characters or any arrangement thereof, giving the manufacturer complete freedom to meet the demands of special problems. Also, even the types of languages which are difficult to compose, such as Hebrew, Arabic, German, etc., are readily composed into printed text without difficulty. The special spacing and printing characteristics of the foreign language characters and symbols are taken care of each by its own indexing or measuring slot 21, while the setting of the characters for exposure is taken care of each by its own selecting means on the integral disc. Thus, the disc may be inserted into the machine wherein it is used without having to match any set machine character width measuring and selector means.

Persons skilled in the art will be able to make numerous changes and to modify various details without departing from the principles of this invention. Accordingly I do not propose limiting the scope of this invention otherwise than necessitated by the appended claims.

I claim:

1. A unitary type font for use with photographic type composing apparatus, comprising a rigid circular disc having a central aperture to receive a spindle and at least one other aperture to receive drive means; an opaque annular band on said disc; a set of transparent characters penetrating said band; a set of uniformly spaced open end radial slots in the circumference of said disc, one slot for each character in said set, each slot serving to position said disc for printing the character associated therewith and having a depth proportional to the width of its associated character, the closed end of each slot constituting a stop to limit the position of a film feed measuring probe, each slot having a flared mouth at its open end, whereby, after said disc is approximately positioned for printing a selected character, pressure by a probe on said flared mouth rotates said disc until said probe enters the body of said slot, whereby said probe accurately positions said disc, and said stop in the end of said slot accurately limits the travel of said probe, said travel controlling the quantity of film feed for printing the character associated with said slot.

2. An interchangeable matrix for use in photocomposition apparatus of the class wherein light exposure of selected characters to photographic film produces printed text and wherein a movable rigid control probe determines and controls film feed, comprising a rigid circular character bearing plate, a set of abutments in said plate, one for each character and having a distance from the circular edge of said plate corresponding to the width of the character associated therewith, said plate having radial slots at its circular edge, each leading to one of said abutments, and a flared mouth comprising a pair of outwardly diverging surfaces at the entrance of each of said slots, whereby pressure by said probe of any one of said surfaces, when the plate has been approximately positioned to align a selected character for light exposure, moves said plate to accurately position said character for printing, and travel by said probe through a slot to the abutment at the bottom thereof controls the amount of film fed to print said character thereupon.

3. A unitary type font for use with photographic type composing apparatus, characterized by the provision of surfaces for precisely positioning the font after an approximate manual setting is made, comprising: a rigid circular disk apertured to receive a spindle and having a set of spaced characters thereon for selective exposure to film; a plurality of spaced radial passages in the edge of said disc, one associated with each character, the depth of each passage being correlated to the width of its corresponding character; and a plurality of pairs of oppositely facing, inwardly converging cam surfaces, one of said pairs for each passage and leading thereto from the edge of said disk, whereby pressure by a radially movable rigid probe against a cam surface causes the disk to deflect until the passage associated with said cam surface is accurately aligned with said probe, whereupon said probe enters said passage and locks said disk precisely in position for printing the character associated with said slot.

4. A matrix for use in a photocomposing machine having an exposure station, a reading station for identifying the character in the exposure station, a spindle for retaining the matrix, a probe movable toward said spindle, and means controlled by said probe for supplying film to said exposure station in proportion to the travel of said probe, comprising: a flat rigid generally circular disk; a central aperture therein; a first series of characters in annular array on said disk for individual display at said reading station; a second series comprising the negatives of the characters in the first font annularly arranged on said disk to be individually photographed at said exposure station, the sequence of characters in said first and second series being the same; and a series of radial slots in said disk, one for each character negative in said second series and arranged in the same sequence, each slot opening into the circumferential face of said disk through a flared mouth, the distance from said circumferential face to the bottom of each slot being proportioned to the amount of film feed appropriate to the character negative related to said slot; whereby pressure of said probe against any flared mouth deflects said disk to precisely locate for photographing the character negative related to said flared mouth, entry of said probe into any slot locks said disk in location, and the travel of said probe to the bottom of any slot determines the quantity of film fed to said exposure station for photographing the character negative related to said slot.

5. In a rotatable unitary photocomposing font, the improvement wherein the circumferential surface is usable to precisely locate and lock the font and to control the quantity of film allotted to each font character, comprising a rigid disk having a plurality of radial passages opening into the outer circumference of said disk, one for each font character, the depth of each passage being proportional to the width of the font character associated therewith, each passage having a flared mouth, whereby force directed radially inward against any flared mouth tends to turn said disk, the insertion of a probe into any radial passage locks said disk, and the movement of said probe in traversing any radial passage causes film to be fed in proportion to the depth of said passage.

6. A unitary type font for use with a rotatable shaft and a rigid probe constrained to move toward the center of rotation of said shaft, comprising: a rigid disc mountable for rotation with said shaft, a set of characters on said disc, a series of cam surfaces along the periphery of said disc, a series of slots along said periphery and extending radially inwardly of the disc, the cam surfaces being located one on each side of each slot leading into the slot, each character being associated with a slot, the distance from the peak of each cam surface to the depth of its adjacent slot being a direct function of the width of its associated character, whereby pressure by said probe against any cam surface turns said disc until said probe enters the slot communicating with said surface, thereby locking said disc in a position determined by said slot.

7. A unitary type font for use with a rotatable shaft and a rigid probe constrained to move toward the center of rotation of said shaft, comprising: a rigid disc mounted for rotation with said shaft, a set of characters on said disc, a series of pairs of cam surfaces along the periphery of said disc, each character being associated with a pair of cam surfaces, each pair of cam surfaces being inwardly converging towards the center of said disc, said disc having a plurality of radial slots, each slot being associated with a pair of cam surfaces, the side walls of each slot leading outwardly to its associated pair of cam surfaces and leading inwardly to a base portion spaced from the center of said disc, the distance from the center of said disc to the base portion of each said slot being a function of the width of its associated character, whereby pressure by said probe against any cam surface turns said disc until said probe enters a said slot.

References Cited in the file of this patent

UNITED STATES PATENTS

| | | |
|---|---|---|
| 1,117,159 | Berst | Nov. 17, 1914 |
| 1,787,662 | Boedicker | Jan. 6, 1931 |
| 2,203,437 | Levy | June 4, 1940 |

FOREIGN PATENTS

| | | |
|---|---|---|
| 174,621 | Great Britain | Apr. 25, 1923 |